US010272333B2

(12) United States Patent
Kataoka et al.

(10) Patent No.: US 10,272,333 B2
(45) Date of Patent: Apr. 30, 2019

(54) GAME SYSTEM

(75) Inventors: Yumi Kataoka, Tokyo (JP); Shinichi Tanaka, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 2052 days.

(21) Appl. No.: 12/595,298

(22) PCT Filed: Mar. 17, 2008

(86) PCT No.: PCT/JP2008/000620
§ 371 (c)(1),
(2), (4) Date: Nov. 24, 2009

(87) PCT Pub. No.: WO2008/129792
PCT Pub. Date: Oct. 30, 2008

(65) Prior Publication Data
US 2010/0137046 A1     Jun. 3, 2010

(30) Foreign Application Priority Data

Apr. 18, 2007 (JP) .................................. 2007109318
Apr. 18, 2007 (JP) .................................. 2007109898
Apr. 18, 2007 (JP) .................................. 2007109899

(51) Int. Cl.
*A63F 13/23* (2014.01)
*A63F 13/323* (2014.01)
(Continued)

(52) U.S. Cl.
CPC ............ *A63F 13/323* (2014.09); *A63F 13/12* (2013.01); *A63F 13/327* (2014.09);
(Continued)

(58) Field of Classification Search
CPC .... A63F 13/323; A63F 13/327; A63F 13/493; A63F 13/12; A63F 2300/636; A63F 2300/403; A63F 2300/208
(Continued)

(56) References Cited

U.S. PATENT DOCUMENTS 4,188,665 A * 2/1980 Nagel .................... G06F 13/225
710/45
5,772,512 A * 6/1998 Chichester .......... A63F 3/00028
463/40
(Continued)

FOREIGN PATENT DOCUMENTS

JP     2000279640 A    10/2000
JP     2001314644 A    11/2001
(Continued)

OTHER PUBLICATIONS

Lin et al (Applying Database Replication to Multi-player Online Games) (Year: 2006).*
(Continued)

*Primary Examiner* — Mamon Obeid
(74) *Attorney, Agent, or Firm* — Matthew B. Dernier, Esq.

(57) ABSTRACT

A mobile game device and a game console share an image file relating to a game; the mobile game device and the game console are connected so as to be able to transmit data with each other via a wire or wirelessly, and the game console is connected to an image-file-providing server retaining an image file via a network; the game console acquires an image file from the image-file-providing server and the mobile game device acquires an image file from the game console, by which the image file is shared between the game instruments.

6 Claims, 8 Drawing Sheets

(51) Int. Cl.
   *A63F 13/493* (2014.01)
   *A63F 13/327* (2014.01)
   *A63F 13/30* (2014.01)
   *G06F 9/46* (2006.01)

(52) U.S. Cl.
   CPC ...... *A63F 13/493* (2014.09); *A63F 2300/208* (2013.01); *A63F 2300/403* (2013.01); *A63F 2300/636* (2013.01); *G06F 9/46* (2013.01)

(58) Field of Classification Search
   USPC .......................................................... 463/43
   See application file for complete search history.

(56) References Cited

U.S. PATENT DOCUMENTS

| | | | | |
|---|---|---|---|---|
| 6,338,680 B1* | 1/2002 | Connors | ................ | A63F 13/02 273/148 B |
| 6,386,979 B1* | 5/2002 | Ho | ................ | A63F 13/02 463/43 |
| 6,452,786 B1* | 9/2002 | Ogata | ................ | A63F 13/08 200/5 A |
| 6,716,102 B2 | 4/2004 | Whitten et al. | | |
| 6,811,490 B2* | 11/2004 | Rubin | ................ | A63F 13/10 463/43 |
| 7,278,031 B1* | 10/2007 | Best | ................ | A63F 13/10 713/191 |
| 9,426,207 B2* | 8/2016 | Beverly | ................ | A63F 13/12 |
| 2001/0039212 A1* | 11/2001 | Sawano | ................ | A63F 13/12 463/43 |
| 2002/0112171 A1* | 8/2002 | Ginter | ................ | G06F 21/10 713/185 |
| 2002/0142845 A1 | 10/2002 | Randall Whitten et al. | | |
| 2003/0114227 A1* | 6/2003 | Rubin | ................ | A63F 13/10 463/43 |
| 2005/0233804 A1* | 10/2005 | Hata | ................ | A63F 13/10 463/29 |
| 2006/0094512 A1* | 5/2006 | Yoshino | ................ | A63F 13/00 463/47 |
| 2006/0152509 A1* | 7/2006 | Heirich | ................ | G06F 11/362 345/426 |
| 2006/0160626 A1* | 7/2006 | Gatto | ................ | A63F 13/12 463/43 |
| 2006/0166744 A1* | 7/2006 | Igarashi | ................ | A63F 13/10 463/43 |
| 2006/0259579 A1* | 11/2006 | Beverly | ................ | A63F 13/12 709/217 |
| 2007/0021216 A1* | 1/2007 | Guruparan | ................ | A63F 13/10 463/43 |
| 2007/0067768 A1* | 3/2007 | Breckner | ................ | A63F 13/12 717/174 |
| 2008/0109632 A1* | 5/2008 | Vishlitzky | ................ | G06F 3/0601 711/209 |
| 2008/0182668 A1* | 7/2008 | Tominaga | ................ | A63F 13/12 463/43 |
| 2009/0325690 A1* | 12/2009 | Zhou | ................ | A63F 13/12 463/29 |
| 2010/0137046 A1* | 6/2010 | Kataoka | ................ | A63F 13/12 463/1 |
| 2012/0191683 A1* | 7/2012 | Tanaka | ................ | G06F 16/188 707/705 |
| 2012/0191765 A1* | 7/2012 | Tanaka | ................ | G07F 17/3202 707/821 |
| 2012/0192171 A1* | 7/2012 | Tanaka | ................ | G06F 8/66 717/168 |
| 2012/0221318 A1* | 8/2012 | Shimizu | ................ | A63F 13/77 703/23 |
| 2013/0005488 A1* | 1/2013 | Evans | ................ | G06F 21/31 463/43 |

FOREIGN PATENT DOCUMENTS

| | | | |
|---|---|---|---|
| JP | 2002175218 | A | 6/2002 |
| JP | 2002358221 | A | 12/2002 |
| JP | 2003053038 | A | 2/2003 |
| JP | 2004033266 | A | 2/2004 |
| JP | 2004-313402 | A | 11/2004 |
| WO | 2005039717 | A1 | 5/2005 |
| WO | 2006109998 | A1 | 10/2006 |

OTHER PUBLICATIONS

PS3 tono "Remote Play" o Jitsugen suru PSP Up Data ga Kokai, [online], Nov. 21, 2006.
PSP to PS3 no Renkei Kino "Remote Play" o Tsukatte Miru, [online], Nov. 21, 2006.
International Search Report for corresponding PCT application PCT/JP2008/000620, dated Jun. 3, 2008.
International Preliminary Report on Patentability and Written Opinion for corresponding PCT application PCT/JP2008/000620, dated Nov. 10, 2009.
Japanese Office Action for corresponding JP Application No. 2007-109318, dated Jul. 26, 2011.
Japanese Office Action for corresponding JP Application No. 2007-109898, dated Jul. 26, 2011.
Japanese Office Action for corresponding JP Application No. 2007-109899, dated Jul. 26, 2011.
Japanese Office Action for corresponding JP Application No. 2007-109318, dated Jun. 12, 2012.
Japanese Office Action for corresponding JP Application No. 2007-109898, dated Jun. 12, 2012.
Japanese Office Action for corresponding JP Application No. 2007-109899, dated Jun. 26, 2012.
"Special Topic 2, New Twist!! PSP Complete Hacking Course!! Shocking, Easy, Powerful, PSP Game Copy Complete Version," Windows 100%, Shinyusha Co., Ltd., Dec. 1, 2005, vol. 8, No. 12, p. 38-45, (pp. 1-13 provided), See translation of Office Action for JP Application No. 2007-109318, dated Jun. 12, 2012, p. 2 for statement of relevancy, and see translation of Office Action for JP Application No. 2007-109898, dated Jun. 12, 2012, pp. 1-3 for statement of relevancy.
"Special Topic 3, From PC/AT Compatible Emulators to PlayStation Emulators, Learn How to Work With Practically Enjoyable Emulators! Forbidden Emulator Complete Works, Part 2, Let's Enjoy House-use Game Device Software Using Windows Machines," PCJapan, Softbank Publishing Inc., Apr. 1, 2002, vol. 7, No. 4, p. 156-163, (pp. 1-14 provided). See translation of Office Action for JP Application No. 2007-109898, dated Jun. 12, 2012, pp. 3-4 for statement of relevancy.

\* cited by examiner

202

202

202

202

202

202

202

202

GAME SYSTEM

FIELD OF THE INVENTION

The present invention generally relates to information processing technology, and more particularly, to information processing technology utilized in a game system comprising a plurality of game devices.

BACKGROUND TECHNOLOGY

Recently, a technique called emulation, wherein software developed for certain target hardware is operated on hardware different from the target hardware, is gaining attention. In the emulation technique, hardware resources provided by the target hardware, for example, a CPU (Central Processing Unit), memory, a disk system, or the like, are virtually implemented by an emulator program. When an application program to be executed on the target hardware is going to access those hardware resources, an emulator program that implements the hardware resources to be accessed inputs or outputs data as though the hardware has actually responded. This allows the application program to operate.

Generally, an emulation device for games has a hardware structure different from conventional game devices and sometimes does not comprise a ROM drive that drives a ROM or a ROM cartridge for games, a slot for mounting external memory medium such as a memory card, or the like, which are used by conventional game devices. Meanwhile, recent developments in technology increase the capacity of memory medium dramatically, and emulation devices of recent years are configured to be able to equip a memory medium having a capacity larger than that of a memory medium used with conventional game devices. Therefore, with the emulation devices of recent years, the ROM image of a game program is read into such a large-capacity external memory medium or a internal memory medium, and the game is executed, accordingly. See, for example, Japanese patent application: Publication No. 2001-314644 (hereinafter referred to as patent document 1).

In past years, stationary game consoles are commonly used. Recent innovations in technology allow mobile game devices to realize performance by no means inferior to that of game consoles. In such a situation, ideally, a system with which existing data can be used efficiently in a circumstance where game consoles and mobile game devices both exist is desired. However, since the hardware and software specifications of respective game consoles or mobile game devices are different, there are lots of obstacles to establish such a system. Therefore, the development of a game system where a game console and a mobile game device can use data efficiently by using an emulation technique or an information processing technique is highly expected.

Furthermore, the hardware of game devices are tend to be renewed every few years. A new model game device can retain compatibility with an old game device by installing an emulator program. In this regard, it is preferable that a user can use save data, stored while playing with an old model game device, also with the new model game device without modification. By realizing an environment that allows replication processing of save data without extra work by a user and as efficiently as possible, a user-friendly game system can be provided for a user.

Therefore, a purpose of the present invention is to provide a technique relating to a game system that can utilize data efficiently and relating to a game device implementing that kind of game system.

SUMMARY OF THE INVENTION

In this background, according to one embodiment of the present invention, a game system is provided. The game system comprises a game console and a mobile game device, wherein the game console and the mobile game device share an image file relating to a game.

According to another embodiment of the present invention, a game system operative to replicate an image file of a game program retained by a first game device to a second game device is provided, wherein the first game device transmits the image file of the game program to the second game device and specifies a storage region in storage of the second game device where the save data of the game program is to be stored.

According to another embodiment of the present invention, a game device is provided. The game device is operative to replicate an image file of a game program retained by the device to a terminal device, wherein the game device transmits the image file of the game program to the terminal device and specifies a storage region in storage of the terminal device where the save data of the game program is to be stored.

According to another embodiment of the present invention, a game system for replicating save data retained by a first game device to a second game device is provided, wherein the second game device stores the save data transmitted from the first game device into a storage region specified according to identification information that identifies the game uniquely.

According to another embodiment of the present invention, a game device is provided. The game device is for replicating save data of a game retained by the game device to a terminal device, wherein the game device stores save data into a storage region in the terminal device specified according to identification information that identifies a game uniquely.

According to another embodiment of the present invention, a game system operative to replicate save data retained by a first game device to the second game device is provided, wherein in case a game program is executed by the second game device, the system searches whether save data of the game is retained in the first game device and if the save data is retained, replicates the save data to the second game device.

Optional combinations of the aforementioned constituting elements, and implementations of the invention in the form of methods, apparatuses, systems, recording mediums and computer programs may also be practiced as additional modes of the present invention.

DESCRIPTION OF THE REFERENCE NUMERALS

1 . . . game system, 10 . . . USB cable, 20 . . . router, 30 . . . network, 40 . . . image-file-providing server, mobile game device 100 . . . mobile game device, 110 . . . communication unit, 120 . . . receiving unit, 130 . . . processing unit, 150 . . . transmitting unit, 160 . . . storage controller, 170 . . . storage, 200 . . . game console, 202 . . . output device, 204 . . . game controller, 210 . . . operation-input-receiving unit, 212 . . . communication unit, 220 . . . receiving unit, 230 . . . processing unit, 250 . . . transmitting unit, 260 . . . storage controller, 270 . . . storage.

DETAILED DESCRIPTION OF THE INVENTION

Figure 1:
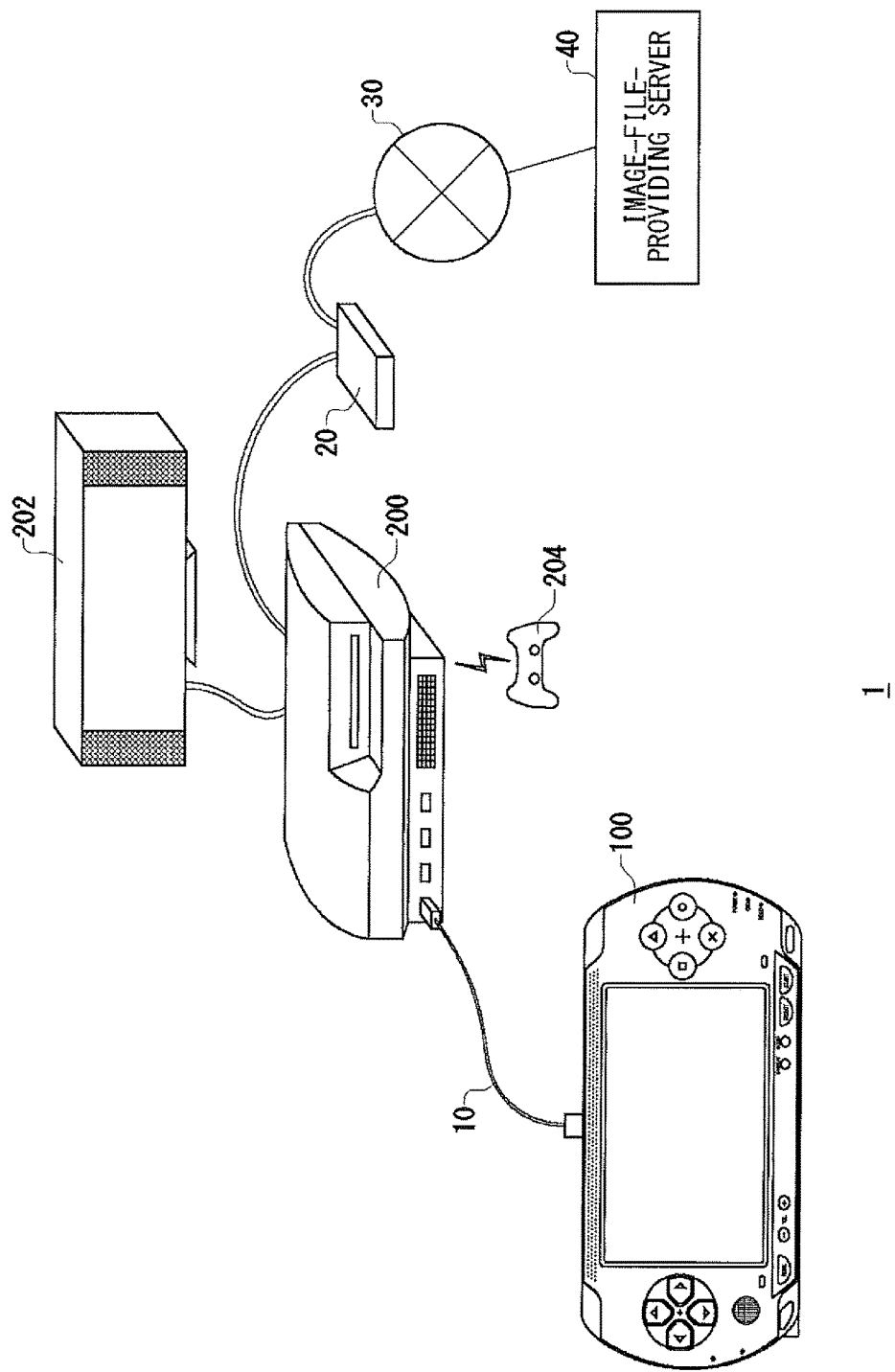
FIG. 1 shows the structure of a game system according to an exemplary embodiment of the invention.

FIG. 1 shows the structure of a game system 1 according to an exemplary embodiment. The game system 1 comprises a mobile game device 100, a game console 200 that is connected with the mobile game device 100 with a USB cable Universal Serial Bus 10, a router 20 connected with the game console 200, and an image-file-providing server 40 connected with the router 20 via a network 30. The image-file-providing server 40 provides the game console 200 with a package file binding an image file of a game program, accompanying information, or the like. The mobile game device 100 may acquire the image file from the game console 200, or may acquire the image file directly from the image-file-providing server 40. The image file of a game program is data stored in one file. The data includes the complete memory content of a memory medium wherein a game program is stored, and includes the structure of the memory medium. The image file is generated in a format that is executable by an emulator program in the game console 200, the mobile game device 100 or the like. An representative example of the image file is, "ISO image", which is a CD image file in the format of ISO 9660, or the like. A file storing the content of the ROM recording a game program is sometimes referred to as "ROM image."

Although the mobile game device 100 and the game console 200 are connected with each other using the USB cable 10 in the present exemplary embodiment, they may be connected using another cable. Alternatively, they may have wireless communication function and may be wirelessly connected with each other. In the game system 1, the game console 200 may be USB-connected with the mobile game device 100, by which, the game console 200 may play a role of a host to the storage of the mobile game device 100 and may have a function for controlling read/write of data to/from the storage of the mobile game device 100.

The game console 200 is an information processing apparatus provided with a high-capacity storage, such as a hard disk or the like. The game console 200 stores, into storage, an emulator program and the image file of a game program provided by the image-file-providing server 40. The game console 200 has a ROM drive and operates independently as a game device by being inserted the ROM for game into the ROM drive and executing a game program. The game console 200 can also operate as an emulation device that can execute an image file of a game program by starting an emulator program. The emulator program may be acquired via the network 30 or may be pre-installed before shipping.

The mobile game device 100 is an information processing apparatus having a built-in or detachable high-capacity storage, such as flush memory or the like. The mobile game device 100 stores an emulator program and the image file of a game program provided by the game console 200 into storage. The mobile game device 100 operates independently as a game device. In addition, the mobile game device 100 can also operate as an emulation device that can execute an image file of a game program by starting an emulator program. The emulator program may be acquired from the game console 200 or from another apparatus via the network 30 or may be pre-installed before shipping.

The output device 202 is provided with a display for outputting the image. The output device 202 may be a television having a speaker for outputting sound. The output device 202 may be connected with the game console 200 with a wire or cable or may be wirelessly connected with the game console 200 by wireless LAN (Local Area Network) or the like.

The game controller 204 is an input interface device allowing a user to input an operation into the game console 200. The game controller 204 may transmit the operation input wirelessly or may be connected to the game console 200 via a cable.

The image-file-providing server 40 generates a package file including an image file of a game program for a certain game device and provide the game console 200 and/or mobile game device 100 with the package file. For example, the image-file-providing server 40 transmits the list of game titles that can be downloaded to the game console 200. Then, by allowing a user to select a desired game title, the game console 200 downloads the image file into storage, such as into a hard disk or the like. In the present exemplary embodiment, the game title refers to information that identifies game software. A game title and a piece of game software (a game program) have a one-to-one correspondence with each other. The game console 200 starts the emulator program and reads the downloaded image file, by which the game console 200 can execute the game as though the game console 200 is the particular game device.

In a similar manner, the mobile game device 100 downloads the image file of a desired game title from the image-file-providing server 40 or is exported the image file of a desired game title from the game console 200 by which, the mobile game device 100 allows the memory medium, such as flash memory or the like, to retain an image file. The mobile game device 100 starts the emulator program and reads the acquired image file, by which, the mobile game device 100 can execute the game as though the mobile game device 100 is the certain game device.

Conventional game consoles typically use an external memory medium having memory capacity of around 1 Mega byte, such as a memory card or the like, in order to record the save data of a game. However, the memory capacity of the memory cards are now relatively small and instead of the memory cards, game devices have come to comprise a large-capacity memory medium such as a hard disk or flash memory. Therefore, the game console 200 or the mobile game device 100 often do not provide an opening (slot) for insertion of a memory card, which is used in a conventional game device. On the other hand, conventional game programs are generated, in accordance with the hardware structure of conventional game devices, while assuming the reading of data from or the writing of data onto a memory card. Therefore, in order to execute the game program in the latest game console 200 or mobile game device 100, it is necessary to virtually generate a memory card (hereinafter also referred to as a "virtual memory card"). The virtual memory card is an image file stored in one file and includes the memory content of a conventional memory card and the structure thereof. The image file is generated in a format readable by an emulator program in the game console 200, the mobile game device 100, or the like. When a game program is executed by an emulator program, the virtual memory card is allotted to a virtual slot.

Figure 2:
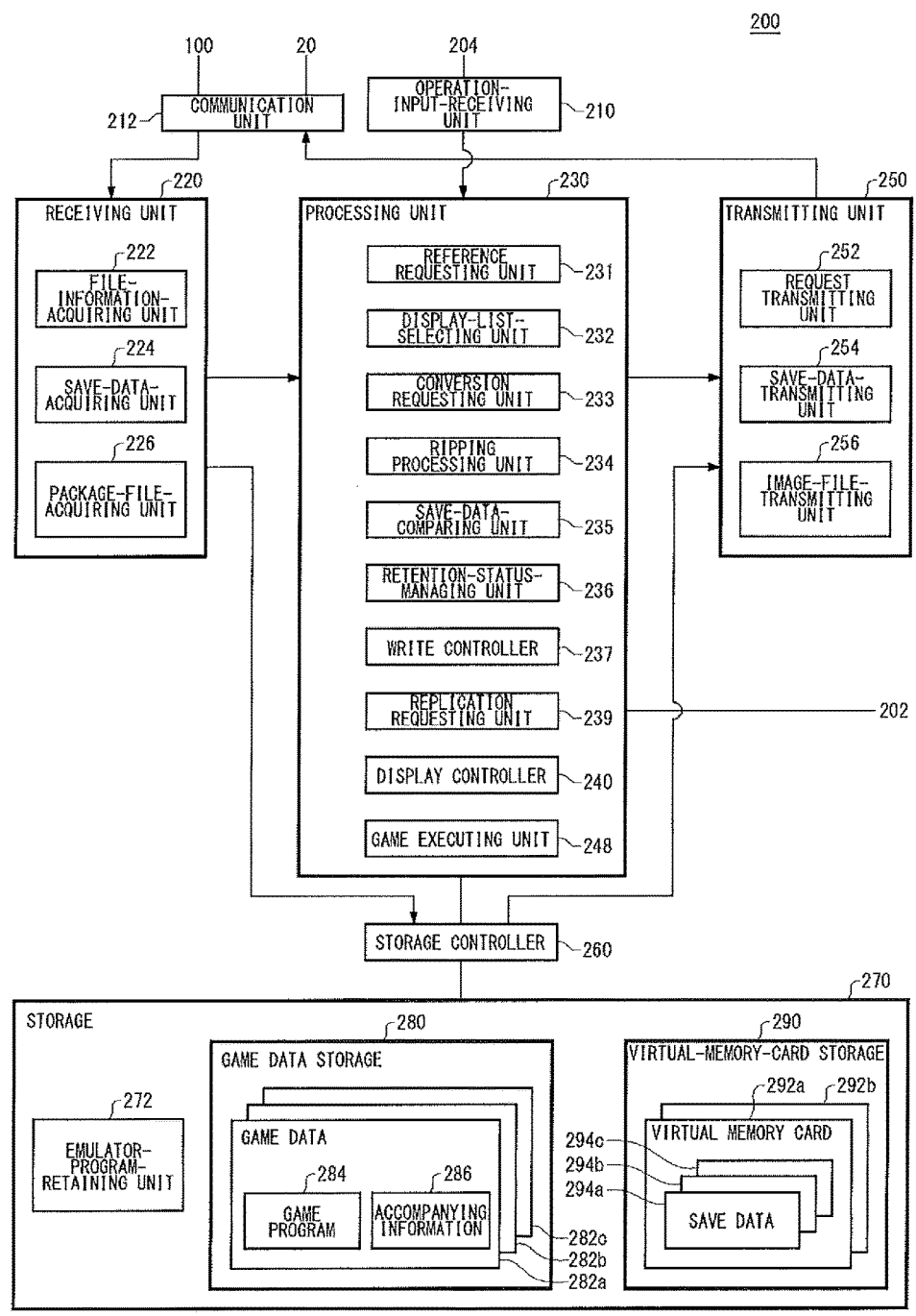
FIG. 2 shows the structure of a game console.

FIG. 2 shows the structure of a game console 200. The game console 200 is provided with an operation-input-receiving unit 210, a communication unit 212, a receiving unit 220, a processing unit 230, a transmitting unit 250, a storage controller 260, and storage 270. The operation-input-receiving unit 210 receives operation input from a user via the game controller 204. The communication unit 212 is connected with the receiving unit 220 and with the transmitting unit 250, and sends data to and/or receives data from the mobile game device 100 and router 20. As described before, the communication unit 212 may establish wireless connection or may establish wired connection with the mobile game device 100 and with the router 20.

The receiving unit 220 comprises a file-information-acquiring unit 222, a save-data-acquiring unit 224 and a package-file-acquiring unit 226. The file-information-acquiring unit 222 acquires the storage of the mobile game device 100, more specifically, the file-information-acquiring unit 222 acquires the directory structure of the storage of the mobile game device 100, the name of save data file, or the like. The save-data-acquiring unit 224 acquires save data from an external terminal device. The external terminal device may be the mobile game device 100 connected via the USB cable 10, or may be an external adapter device for a memory card. The save data is data indicating the progressing status of a game for a user, and configured to be associated with an ID that identifies a game title. The package-file-acquiring unit 226 acquires from the image-file-providing server 40 a file wherein the image file of a game program and other accompanying information or the like are packaged.

The transmitting unit 250 comprises a request transmitting unit 252, a save-data-transmitting unit 254 and a image-file-transmitting unit 256. The request transmitting unit 252 transmits a request generated in the processing unit 230 to the mobile game device 100. The save-data-transmitting unit 254 transmits save data to the mobile game device 100. The image-file-transmitting unit 256 transmits an image file to the mobile game device 100.

The processing unit 230 comprises a reference requesting unit 231, a display-list-selecting unit 232, a conversion requesting unit 233, a ripping processing unit 234, a save-data-comparing unit 235, a retention-status-managing unit 236, a write controller 237, a replication requesting unit 239, a display controller 240, and a game executing unit 248. The processing unit 230 implements a function for sharing desired data between the mobile game device 100. The storage 270 is storage such as a hard disk or the like and is provided with an emulator-program-retaining unit 272, a game data storage 280, and a virtual-memory-card storage 290. Although the emulator-program-retaining unit 272, the game data storage 280, and the virtual-memory-card storage 290 may be formed in the same storage 270, they may also be formed in different storage units. The storage controller 260 controls the reading and writing of data from/to the storage 270.

The game data storage 280 stores a plurality of pieces of game data 282a, 282b, and 282c (hereinafter referred to as "game data 282" when collectively referred.) The game data 282 is provided with the game program 284 and the accompanying information 286 included in the package file acquired by the package-file-acquiring unit 226. The game program 284 is, for example, a ROM image of a game program, thus an image file of a game program stored, for example, in a ROM for a game. The accompanying information 286 is a group of data used when an emulation function is executed by the game console 200. The accompanying information 286 includes information such as a set-up file for an emulator, a game title to be displayed using a GUI Graphical User Interface or the like. The accompanying information 286 may be information directly retrieved from a ROM for a game, information retrieved from the image file of a game program, or information generated for emulation. The virtual-memory-card storage 290 stores a plurality of pieces of game data 292a and 292b (hereinafter referred to as "game data 292" when collectively referred). Although the virtual memory card 292 can have a plurality of pieces of save data 294a, 294b, and 294c, the virtual memory card 292 can be blank with no save data 294.

The virtual memory card 292 is a subject matter to be displayed visually as an icon on the menu screen or the like on the output device 202. In a similar manner, the save data 294 is also subject matter to be displayed visually as an icon on the menu screen or the like of the output device 202. The icon representing the existence of the save data 294 is included in the save data 294 as image data. In the game console 200, a user can freely generate a virtual memory card 292 and can freely store the save data 294 into the virtual memory card 292. Therefore, save data of a plurality of types of games may be stored in the virtual memory card 292.

The game executing unit 248 operates as an emulation device by starting the emulator program stored in the emulator-program-retaining unit 272 and by executing the game program 284. In this process, the game executing unit 248 implements an emulator function by reading the accompanying information 286, by which, the unit can behave as though the unit is a different game device. The game executing unit 248 loads the save data 294 of a game program 284 to be executed, by which, the game can be started at the point where user saved the game in the past.

The function of the processing unit 230 may be implemented by a CPU, memory, a computer program loaded in to the memory or the like. FIG. 2 depicts functional blocks implemented by cooperation of those elements. It will be obvious to those skilled in the art that the functional blocks may be implemented in a variety of manners such as, hardware-only, software-only, or a combination of hardware and software.

Figure 3:
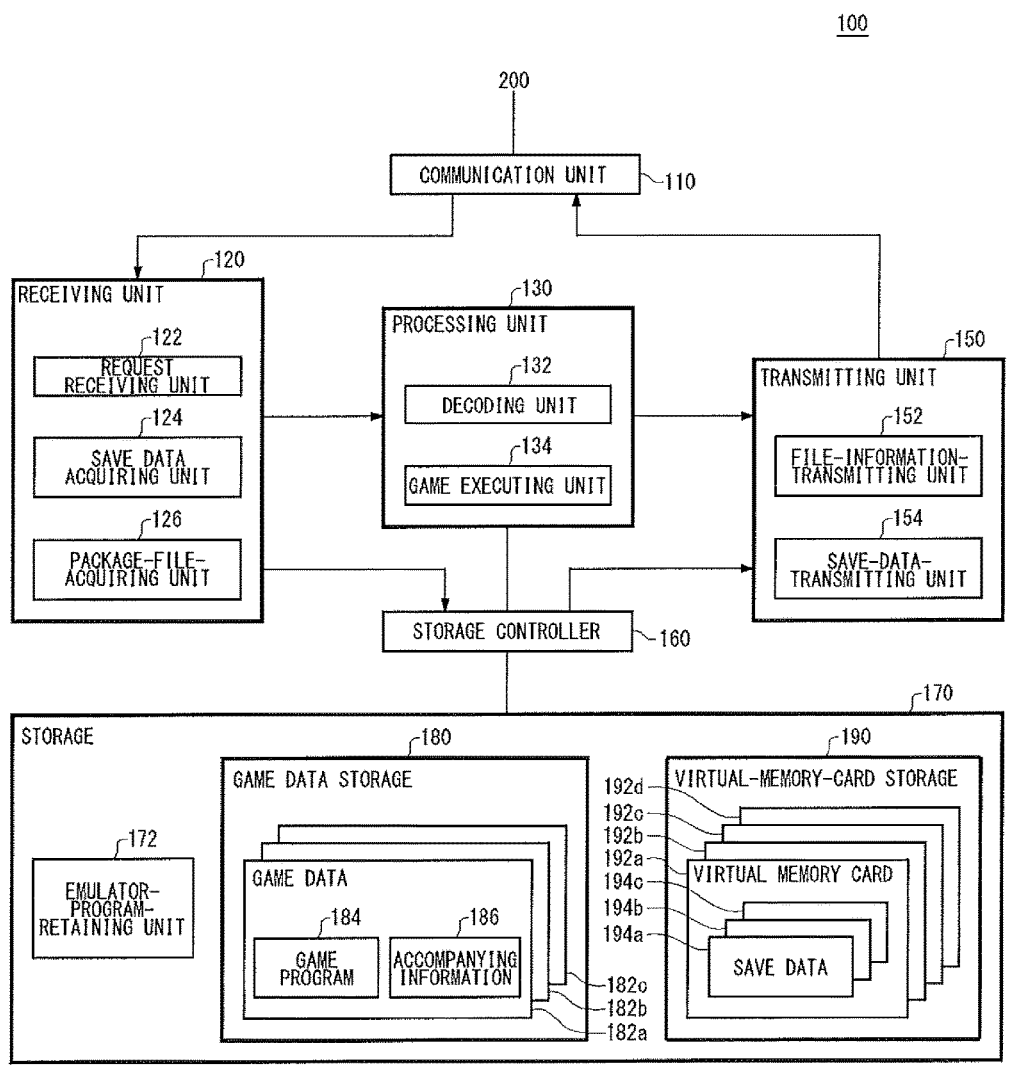
FIG. 3 shows the structure of a mobile game device.

FIG. 3 shows the structure of a mobile game device 100. The mobile game device 100 is provided with a communication unit 110, a receiving unit 120, a processing unit 130, a transmitting unit 150, a storage controller 160, and storage 170. The communication unit 110 is connected to the receiving unit 120 and the transmitting unit 150. The communication unit 110 transmits data to and/or receives data from the game console 200. As described above, the communication unit 110 may establish wireless connection or may establish wired connection with the game console 200.

The receiving unit 120 comprises a request receiving unit 122, a save-data-acquiring unit 124, and a package-file-acquiring unit 126. The request receiving unit 122 receives a variety of requests transmitted from the game console 200. The save-data-acquiring unit 124 acquires save data from an external terminal device. The external terminal device may be the game console 200 connected via the USB cable 10, may be an external adapter device for a memory card, or may be a same type of mobile game device. The package-file-acquiring unit 126 acquires an image file of a game program and other accompanying information from the game console 200 or the like.

The transmitting unit 150 comprises a file-information-transmitting unit 152 and a save-data-transmitting unit 154. The file-information-transmitting unit 152 transmits the file information of the storage 170. The file information is information specifying the directory structure of the storage 170, name of save data file, etc. The save-data-transmitting unit 154 transmits save data to the game console 200. The transmitting unit 150 may comprise an image file transmitting unit and may transmit an image file to the game console 200.

The processing unit 130 comprises a decoding unit 132 and a game executing unit 134. The storage 170 is storage such as flash memory or the like and is provided with a emulator-program-retaining unit 172, a game data storage 180, and a virtual-memory-card storage 190. The storage 170 may be an internal memory medium. Alternatively, the storage 170 may also be a removable medium to be easily attached and detached. Although the emulator-program-retaining unit 172, the game data storage 180 and the virtual-memory-card storage 190 may be formed in the same storage 170, they may also be formed in different storage units. The storage controller 160 controls reading/writing of data from/into the storage 170.

The game data storage 180 stores a plurality of pieces of game data 182a, 182b, and 182c (hereinafter referred to as "game data 182" when collectively referred). The game data 182 is provided with the game program 184 and the accompanying information 186 included in the package file acquired by the package-file-acquiring unit 126. The game program 184 is, for example, a ROM image of a game program, thus an image file of a game program stored, for example, in a ROM for a game. The accompanying information 186 is a group of data used when the emulation function is executed by the mobile game device 100. The accompanying information 186 includes information such as a set-up file for an emulator, a game title to be displayed using a GUI Graphical User Interface, or the like. The accompanying information 186 may be information directly retrieved from the ROM for a game, information retrieved from the image file of a game program, or information generated for emulation. The data formats for the game program 184 and accompanying information 186 of a game title and that for the game program 284 and the accompanying information 286 of the same game title may differ from each other. However, the contents are identical, respectively. The virtual-memory-card storage 190 stores a plurality of pieces of virtual memory card 192a, 192b, 192c, and 192d (hereinafter referred to as "virtual memory card 192" when collectively referred.) Although the virtual memory card 192 can have a plurality of pieces of save data 194a, 194b, and 194c, the virtual memory card 192 can also be blank with no save data 194.

The virtual memory card 192 is a subject matter to be displayed visually as an icon on the menu screen or the like of the mobile game device 100 or the output device 202. In a similar manner, the save data 194 is also subject matter to be displayed visually as an icon on the menu screen or the like on the mobile game device 100 or the output device 202. The icon representing the existence of the save data 194 is included in the save data 194 as image data.

An emulator program started in the mobile game device 100 is structured so as to access, when a game program is executed, only to the virtual memory card 192 of the game. Therefore, one or more virtual memory cards 192 are formed in the virtual-memory-card storage 190 corresponding to the game title, and a save data 194 corresponding to the game is stored in the virtual memory card 192.

The game executing unit 134 operates as an emulation device by starting the emulator program stored in the emulator-program-retaining unit 172 and by executing the game program 184. In this process, the game executing unit 134 implements an emulator function by reading the accompanying information 186, by which, the unit can behave as though being a different game device. The game executing unit 134 loads the save data 194 of a game program 184 to be executed, by which, the game can be started at the point where user saved the game in the past.

<System for Sharing the Image File of a Game Program>

The game system 1 according to the present exemplary embodiment operates as a system for sharing the image file of a game program between the mobile game device 100 and the game console 200. As explained in relation with FIG. 1, the mobile game device 100 and the game console 200 are connected with each other either wired or wirelessly so that they can transmit data to/from each other, and the game console 200 is connected to the image-file-providing server 40 retaining the image file of a game program via the network 30. An explanation will be given below while referring to FIGS. 2 and 3 on the function of the game system 1 for sharing an image file.

In the game console 200, The operation-input-receiving unit 210 receives from the game controller 204 an instruction for connection with the image-file-providing server 40, the communication unit 212 establishes a connection to the image-file-providing server 40, accordingly. The image-file-providing server 40 delivers the list of game titles that can be downloaded, and then, by allowing a user to select a desired game title from the list displayed on the output device 202 using the game controller 204, the request for downloading of game image file is generated. The communication unit 212 downloads a package file from the image-file-providing server 40 and provides the file to the package-file-acquiring unit 226.

In the present exemplary embodiment, the package file includes at least the execution program of game software. In addition, the package file includes accompanying information including the ID of a game title, or the like. The title ID may be the production number of a game, or the like, as far as the title ID can identify each game title uniquely. The package-file-acquiring unit 226 acquires the package file, then the storage controller 260 stores the package file as game data 282 that associates the game program 284 and the accompanying information 286 with each other in the game data storage 280. In this fashion, the game console 200 retains the image file of a game program.

By replicating the image file of a game program to the mobile game device 100, the game console 200 can share the image file with the mobile game device 100. The storage controller 260 provides the game data 282 stored in the game data storage 280 to the image-file-transmitting unit 256. The image-file-transmitting unit 256 has a function for specifying a storage region where the save data is stored in the storage 170 of the mobile game device 100. More specifically, the image-file-transmitting unit 256 packages the instruction for generating a virtual memory card and the game data 282 and provides the package to the communication unit 212. The instruction for generating a virtual memory card includes the number of the virtual memory cards to be generated in accordance with the type of the game program. The image-file-transmitting unit 256 may generate the instruction for generating a virtual memory card by reading the number of the virtual memory cards to generate from the accompanying information of the game program to be transmitted. The image-file-transmitting unit 256 has a function for generating a directory specified by the title ID of the game in the storage 170 of the mobile game device 100. The communication unit 212 transmits those game data 282 and instruction information as a package file to the mobile game device 100.

In the mobile game device 100, the package-file-acquiring unit 126 acquires the package file via the communication unit 110. The package-file-acquiring unit 126 acquires the package file, then the storage controller 160 stores the package file as game data 182 that associates the game program 184 and the accompanying information 186 with each other. This allows the game console 200 and the mobile game device 100 to share the image file of a game program. By allowing game machines that have different hardware to share an image file, generation of a plurality of types of image file becomes unnecessary, and thus an emulation function of respective machines can be efficiently realized.

Further, storage controller 160 generates a virtual memory card 192 in the directory specified by the game title ID, based on the ID of the game title included in the accompanying information 186 and based on the instruction for the generation of the virtual memory card. A directory structure that determines the storage hierarchy of the virtual memory card 192 in the storage 170 is, for example, determined as follows. In case four virtual memory cards are to be generated according to the instruction for generation of the virtual memory cards, the storage controller 160 generates four virtual memory cards in the directory as indicated below.

```
.../SAVEDATA/titleID/VMC0.BBB
.../SAVEDATA/titleID/VMC1.BBB
.../SAVEDATA/titleID/VMC2.BBB
.../SAVEDATA/titleID/VMC3.BBB
```

Four different virtual memory cards are generated under the directory specified by the title ID, and save data can be saved in those memory cards. For different games, directories are categorized depending on the title ID. As described above, the number of the virtual memory cards is determined for each game title. As described above, in the game system 1 according to the present exemplary embodiment, the image file of a game program can be shared by the game console 200 and the mobile game device 100. In this way, the game console 200 allows the storage controller 160 to set a storage region for storing save data as a directory specified by the title ID that identifies the game uniquely in the storage 170, so that the directory structure of the storage 170 in the mobile game device 100 can be established in order.

In the game console 200, the image file of a game program is not only provided from the image-file-providing server 40 but may also be generated directly by ripping a ROM medium. The game console 200 has a ROM drive and has a function for executing a game program by driving a ROM medium and by loading the program into memory. Therefore, the ripping processing unit 234 may rip digital data recorded in a ROM for a game, may generate an image file, and may store the file as the game program 284 in the game data storage 280.

In this manner, the ripping processing unit 234 has a function for executing a ripping process wherein a game program recorded in a memory medium is retrieved as an image file. By this function, the game console 200 can acquire an image file by generating the image file of a game program by itself, without downloading the image file of a game program from the image-file-providing server 40. In this process, the ripping processing unit 234 also generates accompanying information 286 related to that game program in addition to the image file of the game program. As described above, the accompanying information 286 is information necessary when an emulator program executes a game program, and the game executing unit 248 and the game executing unit 134 can operate as an emulation device by using the accompanying information. The ripping processing unit 234 may generate the accompanying information 286 directly from a ROM for a game, may generate the information based on data provided from other server or the like, or may generate the information by combining the data acquired by those variety of ways. The game console 200 may replicate the image file and the accompanying information generated by ripping to the mobile game device 100, by which, the image file and the accompanying information of a game program can be shared between the game console 200 and the mobile game device 100.

An example where the storage controller 160 in the mobile game device 100 takes part in a replicating process of the image file of a game program is indicated above. However, by connecting the game console 200 and mobile game device 100 via a USB port, the processing unit 230 and the storage controller 260 in the game console 200 can treat the storage 170 as an external memory medium. In this process, since the operation explained above as the process executed by the storage controller 160 is executed by the storage controller 260, the replicating process can be simplified. In this case, the storage controller 260 stores the image file of a game program into the storage 170 and executes the process for generation of the virtual memory card 192 in the storage 170.

When game data including the image file and accompanying data of a program is replicated from the game console 200 to a mobile game device 100, it is preferable that the game console 200 specifies a mobile game device 100 to which the data is replicated, encrypts the game data to be transmitted in a manner that only the specified mobile game device 100 can decrypt the data, and transmits the encrypted game data, accordingly. The image-file-transmitting unit 256 executes an encryption process when transmitting game data. The encryption may be based on DRM (Digital Rights Management) technique, for example, the encryption may be executed in a format determined through communicating information relating to the encryption with the device to which data is replicated. In this manner in the game system 1, it is preferable to make consideration to ensure that the image file of a game program is not spread widely when replicating, by an executing encryption process that can only be decrypted in a mobile game device 100 specified as a device to which data is replicated.

<System for Sharing Save Data>

The game system 1 according to the present exemplary embodiment operates not only as a system where a game program is shared but also as a system where save data is shared between the mobile game device 100 and the game console 200. More specifically, the save data can be shared by replicating the save data from one of the game console 200 and the mobile game device 100 to the other of the game console 200 and the mobile game device 100. This allows a user to load the same save data and start playing the game either on the game console 200 or the mobile game device 100. For example, a user can play a game on the mobile game device 100 while going out and can play the same game on the game console 200 after going back home, accordingly. Further, it is also possible to play a game on the game console 200 at home and play the same game outside on the mobile game device 100, accordingly. First, an explanation will be given on the case where save data is replicated from the mobile game device 100 to the game console 200.

In the game console 200, The instruction on reference to the virtual-memory-card storage 190 in the storage 170 in the mobile game device 100 is provided from the operation-input-receiving unit 210. The reference requesting unit 231 generates the request for reference, then the request transmitting unit 252 transmits the request for reference to the mobile game device 100 via the communication unit 212.

In the mobile game device 100, the request receiving unit 122 receives the request for reference to the virtual-memory-card storage 190 via the communication unit 110. The storage controller 160 has a function of a file system. On receiving the request for reference, the storage controller 160 generates file information indicating the directory structure in the storage 170 of the virtual-memory-card storage 190 and the name of save data file. This file information is provided to the file-information-transmitting unit 152 and the file-information-transmitting unit 152 transmits the file information from the communication unit 110 to the game console 200.

In the game console 200, the file-information-acquiring unit 222 acquires the file information via the communication unit 212 and provides the information to the display-list-selecting unit 232. The display-list-selecting unit 232 has a function for selecting save data or a folder (a virtual memory card) of save data to be displayed as a list on the display of the output device 202.

Figure 4:
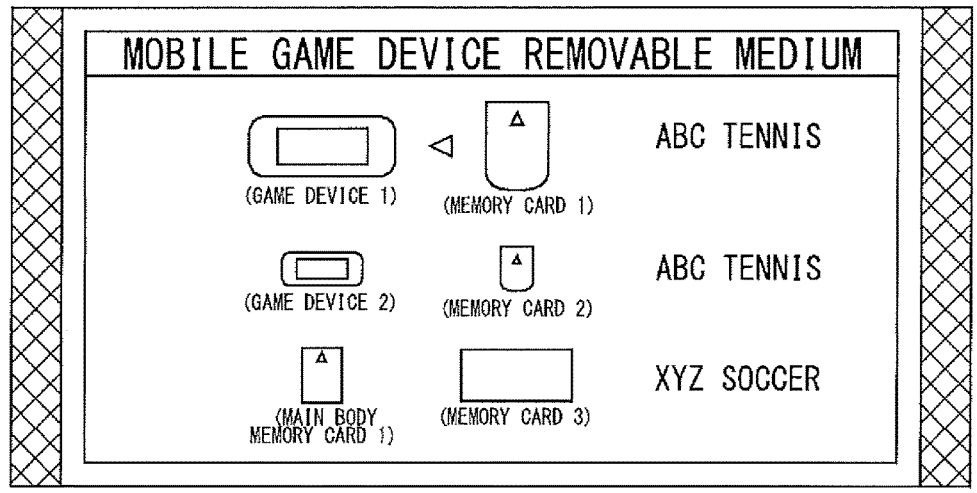
FIG. 4 is an exemplary screen image showing icons of a virtual memory card.

FIG. 4 is an exemplary screen image showing icons of a virtual memory card 192 selected by the display-list-selecting unit 232 and displayed as a list by the display controller 240 on the output device 202. In FIG. 4, the storage 170 in the mobile game device 100 is configured as a removable medium. On the exemplary screen image, "mobile game device removable medium" is displayed on the upper field of the screen in order to specify the displayed information is the information of the content of the removable medium of the mobile game device 100. Further, in the game system 1 according to the present exemplary embodiment, the game console 200 can connect with a plurality of mobile game devices 100, and icons specifying respective mobile game devices 100 being connected, such as, "game device 1", "game device 2" are displayed in the display list on the screen. For example, a name (e.g., nickname or the like) given to each of the mobile game devices 100 by respective users may be displayed under respective icons in order to specify the mobile game device 100. In FIG. 4, the icon displayed as "main body memory card 1" indicates one of the virtual memory cards 292 of the storage 270 in the game console 200. The icons shown as "memory card 1," "memory card 2," and "memory card 3," indicate the virtual memory cards 192 in the storage 170 of the mobile game device 100.

As described above, the number of the existing virtual memory cards 192 of a mobile game device 100 is at least the number of the image files of game programs. Further, a plurality of virtual memory cards 192, may be generated for one game program for some game programs. Therefore, if all the memory cards are displayed as a list, the numbers of the cards is expected to be enormous.

Further, although replication of save data of game programs that are retained by the game console 200 makes sense, replication of save data of game programs that is not retained by the game console 200 is not important, necessarily. The reason for this is that the save data of game programs that are not owned by the game console 200 lacks an opportunity to be used. Therefore, in the processing unit 230 of the game console 200, the retention-status-managing unit 236 manages the retention status of the game data storage 280 and specifies game programs being owned. For example, the retention-status-managing unit 236 may specify the retained game program by using the title ID included in the accompanying information 286 of respective game data 282. The retention-status-managing unit 236 notifies the display-list-selecting unit 232 of the retention status of the image file of game programs. The display-list-selecting unit 232 compares the game title IDs included in the file information transmitted from the mobile game device 100 and the retention status of image files provided by the retention-status-managing unit 236, and omits virtual memory cards 192 of the game program not retained from the list of memory cards to be displayed. On the exemplary screen image in FIG. 4, icons of virtual memory cards for "ABC tennis" "XYZ soccer" are shown. Since it is determined by the display-list-selecting unit 232 that image files of programs of "ABC tennis" and "XYZ soccer" are retained in the game data storage 280, the icons of those virtual memory cards 192 are displayed.

The retention-status-managing unit 236 may specify the retaining game program by managing not only the retention status of the game data storage 280 but also the retention status of the virtual-memory-card storage 290. The retention-status-managing unit 236 can specify game programs that is obviously expected to be retained, based on title IDs included in the save data 294. Further, in addition to the retention status of the game data storage 280 and the retention status of the virtual-memory-card storage 290, the retention-status-managing unit 236 may read the content stored in a ROM for game inserted in the ROM drive, may specify the title ID of the ROM for game, and may specify the retaining game programs, accordingly. In this manner, the retention-status-managing unit 236 specifies executable game programs based on one of or optional combination of the title ID specified based on the retention status of the game data storage 280, the title ID specified based on the retention status of the virtual-memory-card storage 290, or the title ID of a ROM for game contained in the ROM drive. This allows the display-list-selecting unit 232 to select only display-worthy icons of virtual memory cards 192.

In order to further reduce the number of icons of virtual memory cards 192 to be displayed on the output device 202, the display-list-selecting unit 232 may omit icons of virtual memory cards 192 that does not retain save data 194. Since a purpose here is to replicate save data from the mobile game device 100 to the game console 200, it makes no sense if icons of virtual memory cards of the mobile game device 100 that contains no save data are displayed. Therefore, the display-list-selecting unit 232 refers to the file information transmitted from the mobile game device 100, determines whether save data 194 exists in the virtual memory card 192, and icons of virtual memory cards that do not retain save data are omitted from the list of icons to be displayed. This makes it possible to display only icons that retain save data, therefore, the time required for a user to search save data can be cut down. Whether or not to execute such functions for omitting some icons from icons to be displayed may be selected by an instruction from a user.

The display controller 240 displays the icons of virtual memory card selected by the display-list-selecting unit 232 as shown in FIG. 4. User selects one of the icons, and the icons of save data retained in the virtual memory card is displayed hierarchically, accordingly.

However, sometimes a virtual memory card retained in the mobile game device 100 and/or save data retained in the mobile game device 100 is encrypted for exclusive use for the mobile game device 100. Sometimes, the format of an image file of virtual memory card of the mobile game device 100 differs from that of the game console 200. In these cases, the game console 200 can not read the content thereof. Further, since the image data of icon of the save data 194 is stored in the save data 194, even the icon can not be displayed if the save data 194 can not be read. An explanation will be given below on the procedure for handling the case where the icon of save data is not displayed even when one of the icons shown in FIG. 4 is selected with intent to replicate the save data of "ABC tennis."

First, the conversion requesting unit 233 generates a request for acquiring save data of the virtual memory card of the selected icon "ABC tennis". The request transmitting unit 252 transmits that request for acquisition to the mobile game device 100 via the communication unit 212. In the mobile game device 100, on receiving the request for acquisition, the request receiving unit 122 notifies the storage controller 160 thereof. The storage controller 160 reads the virtual memory card 192 of the "ABC tennis" from the virtual-memory-card storage 190. Then the save-data-transmitting unit 154 transmits the read virtual memory card 192 from the communication unit 110. Since this image file (virtual memory card) is encrypted in a particular manner for the mobile game device 100, the game console 200 can not decrypt nor read the data.

Figure 5:
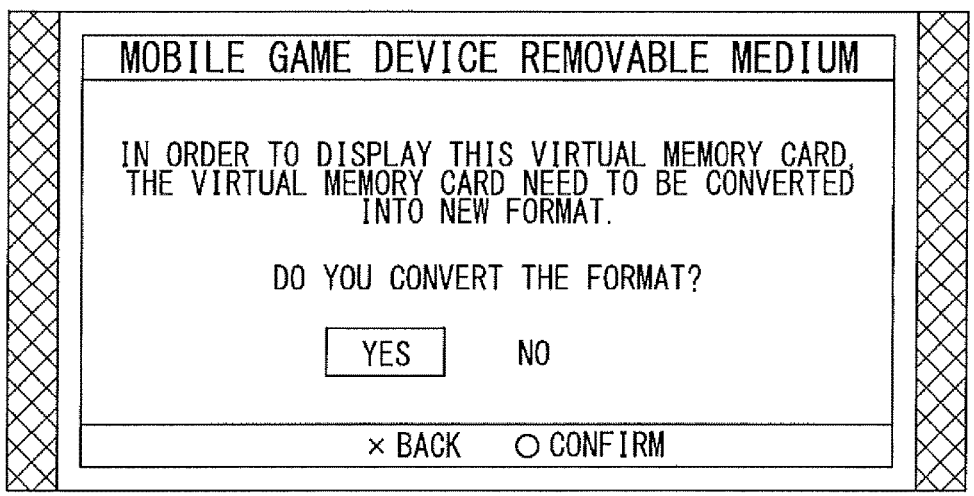
FIG. 5 is an exemplary screen image where conversion processing of an image file is inquired.

FIG. 5 is an exemplary screen image where conversion processing of an image file is inquired. In the game console 200, the save-data-acquiring unit 224 acquires the image file of an encrypted memory card, the screen shown in FIG. 5 is displayed on the display of the output device 202, accordingly. If a user selects "Yes", then the conversion requesting unit 233 generates a format conversion request that requests the conversion of the data format of that image file. The request transmitting unit 252 transmits the acquired image file with the format conversion request to the mobile game device 100.

In the mobile game device 100, the request receiving unit 122 receives the format conversion request and the image file to be decoded and provides them to the decoding unit 132. The decoding unit 132 converts the image file into the format that can be decrypted or executed by the game console 200. Since the image file to be decoded is originally retained by the mobile game device 100, the game console 200 may transmit only the format conversion request to the mobile game device 100. The storage controller 160 may overwrite the image file with the converted image file as a new virtual memory card 192 in the virtual-memory-card storage 190.

Figure 6:
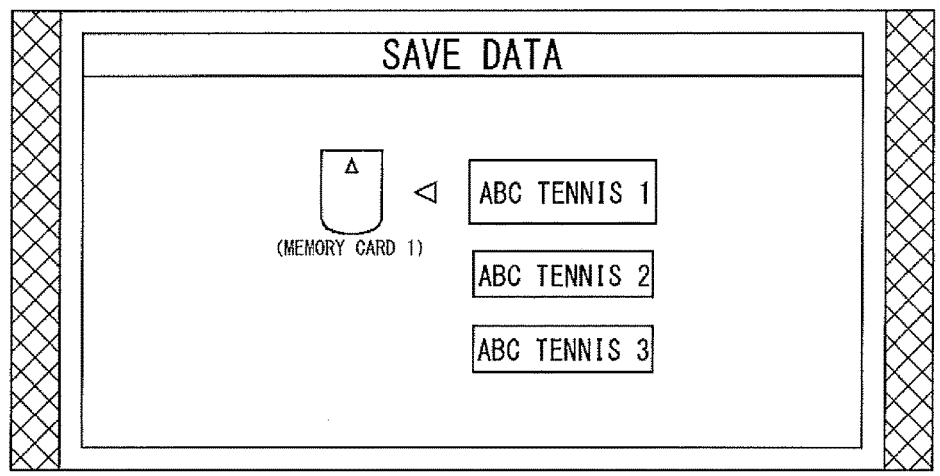
FIG. 6 is an exemplary screen image displaying three pieces of save data included in a virtual memory card.

FIG. 6 is an exemplary screen image displaying three pieces of save data included in the virtual memory card of "ABC tennis". This corresponds to the list of the save data 194 that can be displayed on the output device 202 since the data format of the virtual memory card 192 is converted after a user select an icon identified by the "memory card 1" in FIG. 4. In this manner, even in case where the format for storing data of the mobile game device 100 and that of the game console 200 differ, the same save data can be shared by both sides by processing a necessary conversion.

Figure 7:
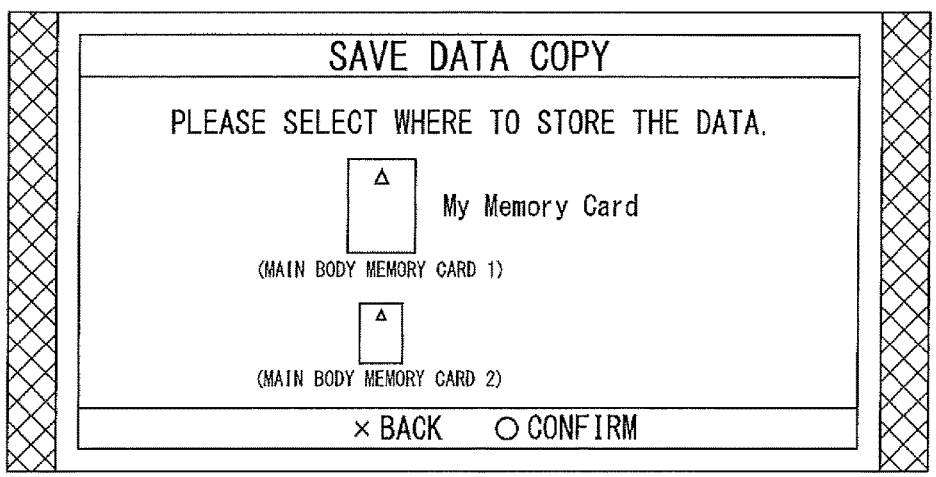
FIG. 7 is an exemplary screen image displayed when save data desired to be replicated is selected.

FIG. 7 is an exemplary screen image displayed when save data desired to be replicated is selected. In FIG. 7, a selection screen for selecting where to store in the game console 200 is displayed. A user selects where to store, then the replication requesting unit 239 generates the request for replicating the save data selected by the user and the request transmitting unit 252 transmits the request, accordingly. In the mobile game device 100, the request receiving unit 122 receives the request for replicating, then the storage controller 160 reads the specified save data 194 from the virtual-memory-card storage 190, and the save-data-transmitting unit 154 transmits the save data 194 to the game console 200 via the communication unit 110, accordingly. This save data 194 is configured in a format that can be read or executed by the game console 200. In order to ensure the security, it is preferable to attach digital signature to the data to be transmitted. The save-data-acquiring unit 224 acquires the format-converted save data, and the storage controller 260 stores the data into the virtual memory card 292, accordingly.

Figure 8:
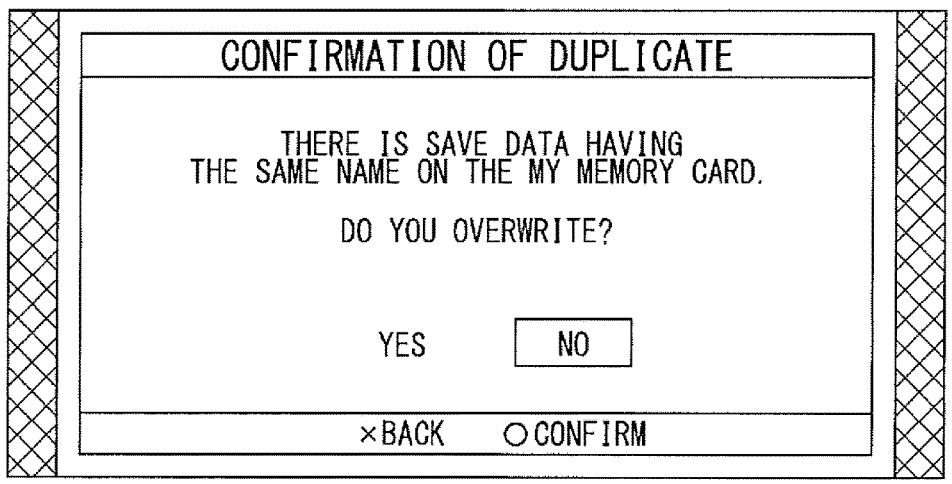
FIG. 8 is an exemplary screen image displayed when save data having a same name exists in virtual memory.
Figure 9:
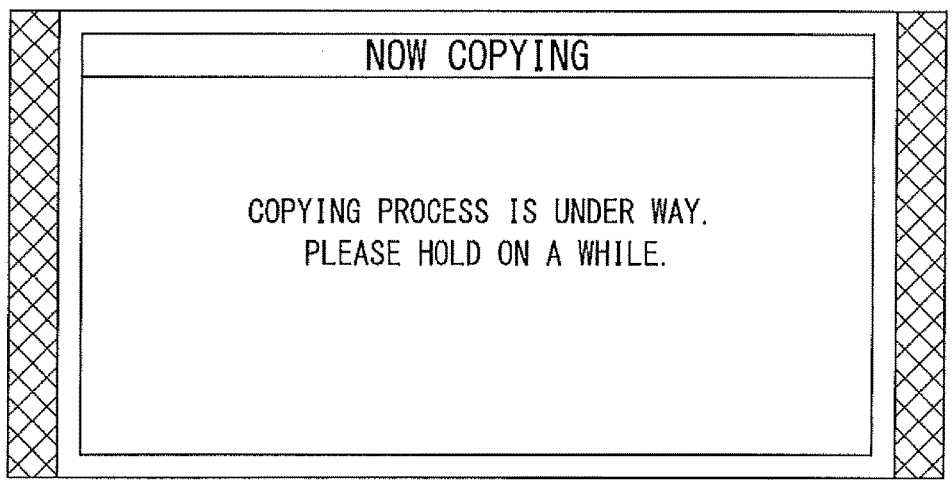
FIG. 9 is an exemplary screen image displayed while replicating save data.

FIG. 8 is an exemplary screen image displayed when save data having the same name exists in the virtual memory card 292. The save-data-comparing unit 235 compares the name of the save data 194 to be written into the virtual memory card 292 and the name of the save data 294 already written in the virtual memory card 292. If the names are identical, the save-data-comparing unit 235 allows the display controller 240 to display a message shown in FIG. 8 on the output device 202. A user determines whether or not to overwrite using the game controller 204. The save-data-comparing unit 235 may extract a part of the content of save data having the same name and may allow the display controller 240 to display respective information. For example, information specifying a play time by the time when respective save data is generated or information specifying a game scene played when the data is saved may be read from the save data and may be added to the message shown in FIG. 8. By including these information into the message, guidelines when determining whether or not to overwrite can be provided for a user. FIG. 9 is an exemplary screen image displayed while replicating save data.

Although the replicating process described above is executed based on the instruction from a user, the game console 200 may have a function, for example for executing replicating process automatically. For example, when the mobile game device 100 and the game console 200 are connected, the replication requesting unit 239 may automatically generate replication requests for all the save data retained in the mobile game device 100. In case of efficiency is desired, it is preferable to automatically generate replication requests not for all the save data but only for save data corresponding to game programs retained in the game console 200. Further, regarding save data that can not be dealt with the game console 200, it is preferable that the conversion requesting unit 233 generates a format conversion request for the save data and the format conversion is complete before issuing a replication request.

Figure 10:
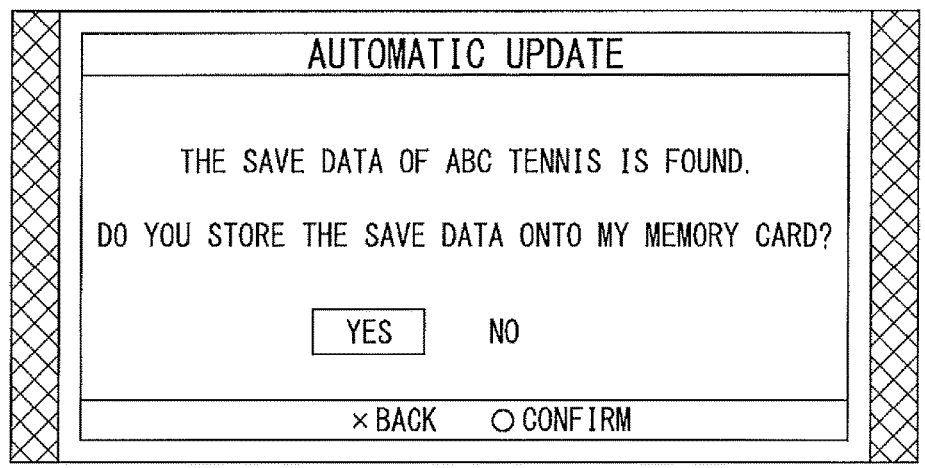
FIG. 10 is an exemplary screen image displayed during the replication processing executed automatically.

FIG. 10 is an exemplary screen image displayed during the replication processing executed automatically. By enabling the automatic replication of save data, an environment for sharing save data can be realized without troubling a user. The storage controller 260 may store discovered save data one after another in the virtual-memory-card storage 290 without displaying the message shown in FIG. 10.

Figure 11:
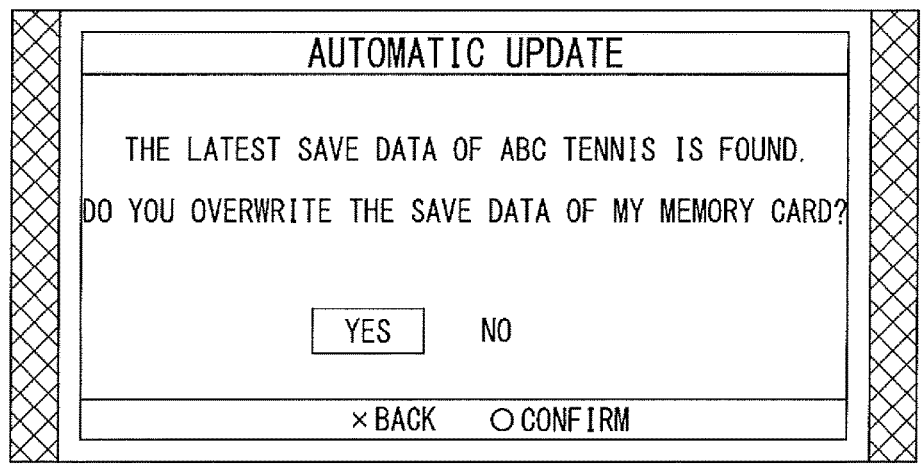
FIG. 11 is an exemplary screen image displayed when save data having the same name is discovered while automatically executing the replication process.

FIG. 11 is an exemplary screen image displayed when save data having the same name is discovered while automatically executing the replication processing. In the screen, a message inquiring a user whether or not to overwrite is displayed as shown in FIG. 8. In this process, in case the save-data-comparing unit 235 determines which is the new save data in terms of updated date and time, replication control processing wherein the new data is prioritized may be executed. That is, if the updated date and time of the save data 194 retained in the mobile game device 100 is newer, the storage controller 260 overwrites the save data 294 of the virtual memory card 292 and if the updated date and time of the save data 194 retained in the mobile game device 100 is older, the save data 294 of the virtual memory card 292 is not overwritten. This enables to leave the newest save data.

Alternatively, the save-data-comparing unit 235 may determine which save data to store based on the play time included in the save data as described above. For example, in case a plurality of pieces of save data having a same name exist, the save-data-comparing unit 235 may determine the priority of save data so that save data generated while the game was played longer hours is left. Alternatively, the save-data-comparing unit 235 may determine the priority of save data so that save data for a scene later in the game is allowed to survive.

In either case, it is preferable that the save-data-comparing unit 235 determines the priority of save data so that save data having higher merits for a user is left.

An example where the storage controller 160 in the mobile game device 100 takes part in replication processing of the save data is shown above. However, by connecting the game console 200 and mobile game device 100 via USB, the processing unit 230 and the storage controller 260 in the game console 200 can treat the storage 170 as an external memory medium. In this process, since the operation explained above as the processing executed by the storage controller 160 is executed by the storage controller 260, the replication processing can be simplified. In this case, the storage controller 260 stores the save data into the storage 170. The decoding processing of the save data is executed in the mobile game device 100 as explained above.

A time point to replicate the save data may be, for example, a time point when the emulator program is started and the game program 284 is executed in the game console 200. The game executing unit 248 executes the game program 284, and then the file-information-acquiring unit 222 acquires the file information. At this point, whether or not the save data of a game program to be executed exist in the storage 170 may be determined by a save data specifying mean (not shown). This save data specifying mean determines whether or not the title ID included in the file information in the storage 170 and the title ID of the game program to be executed match with each other, and if they match, determines that corresponding save data is retained in the storage 170. In this manner, if it is determined that the corresponding save data is retained in the storage 170, the save data specifying mean may allow the save data to be replicated to the storage 270, by which, a necessary save data can be acquired from the mobile game device 100 when a game program is executed.

Next, an explanation will be given on the case where the save data 294 is replicated from the game console 200 to the mobile game device 100. In the mobile game device 100, one or more than one virtual memory cards 192 are generated for one game title and the save data 194 of the game title is stored in the virtual memory card 192.

Figure 12:
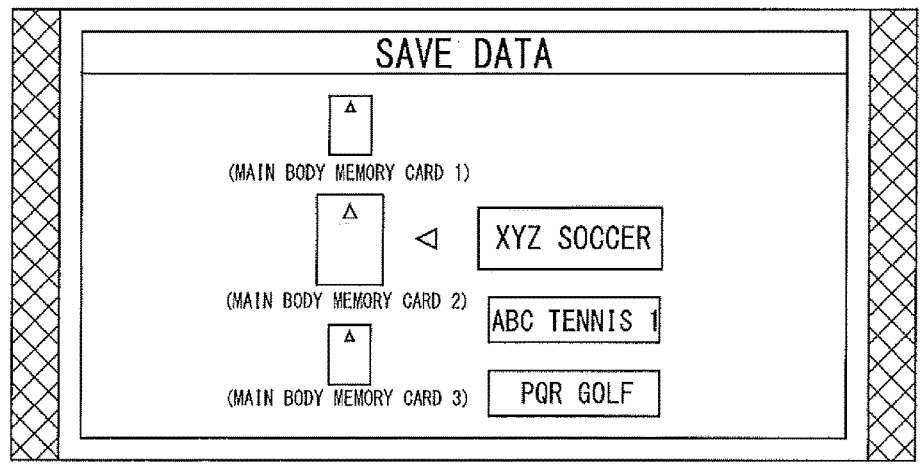
FIG. 12 is an exemplary screen image displaying save data stored in virtual memory.

FIG. 12 is an exemplary screen image displaying save data 294 stored in the virtual memory card 292. In the virtual memory card 292 in the game console 200, save data 294 of a plurality of types of games exist. An explanation will be given below on the case where the save data "XYZ soccer" of the virtual memory card 292 identified by the "main body memory card 2" is selected to be replicated.

Figure 13:
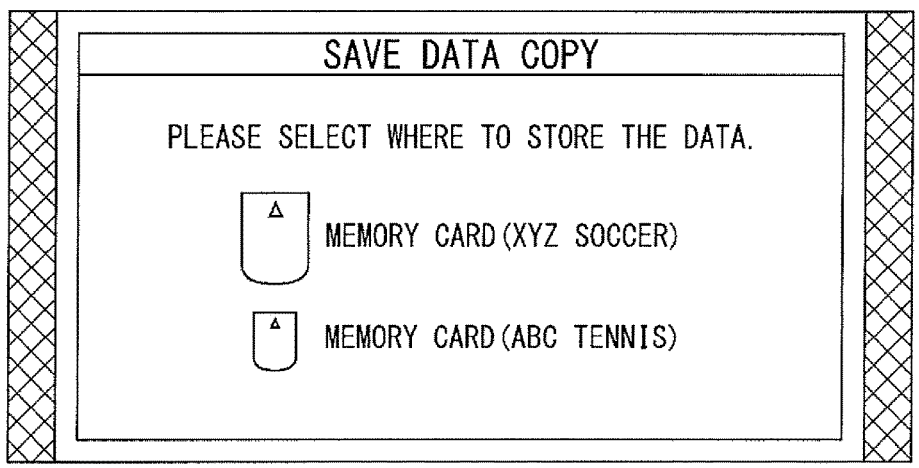
FIG. 13 is an exemplary screen image displayed when save data desired to be replicated is selected.

FIG. 13 is an exemplary screen image displayed when save data 294 desired to be replicated is selected. In FIG. 13, a selection screen for selecting where to store the data is displayed. As described above, in the mobile game device 100, a virtual memory card 192 is generated for each game title, a user have to select a virtual memory card 192 corresponding to save data 294. A user selects where to store, then the write controller 237 generates the write request for writing the save data selected by the user and provides the write request to the request transmitting unit 252. The write request includes information identifying a virtual memory card 192 where the data is written in the storage 170. The storage controller 260 reads the selected save data from the virtual memory card 292 to the request transmitting unit 252. The request transmitting unit 252 transmits the save data 294 and the write request to the mobile game device 100.

In the mobile game device 100, the request receiving unit 122 receives the write request and the save-data-acquiring unit 124 acquires the save data 294. Then the storage controller 160 writes the save data into the virtual memory card 192 specified by the write request, by which, the save data can be shared between the game console 200 and the mobile game device 100. In case the data format of this save data can not be processed by the mobile game device 100, the save data is converted in the game console 200 into the data format decryptable or executable by the mobile game device 100 and transmitted, accordingly.

As described above, although it is possible to allow a user to select where to store the save data, in order to allow the game system 1 to serve more useful function, the write controller 237 may specify where to store the save data. This makes the action of a user for selecting where to store, unnecessary Save data to be replicated to the mobile game device 100 is selected, then the write controller 237 acquires the game title ID of the save data. As described above, since an game title ID is associated with each save data, the write controller 237 can extract the game title ID from save data.

Subsequently, the reference requesting unit 231 generates a request for reference to the virtual memory card, and the request transmitting unit 252 transmits the request to the mobile game device 100 via the communication unit 212. In the mobile game device 100, the request receiving unit 122 receives the request for reference to the virtual-memory-card storage 190 via the communication unit 110, then the storage controller 160 generates file information indicating the directory structure in the storage 170 and the name of the save data file. This file information is provided to the file-information-transmitting unit 152, and the file-information-transmitting unit 152 transmits the file information from the communication unit 110 to the game console 200, accordingly.

In the game console 200, the file-information-acquiring unit 222 acquires the file information via the communication unit 212 and provides the information to the write controller 237. Since the directory structure of the virtual-memory-card storage 190 includes the title ID as described above, the write controller 237 searches for the directory structure including a title ID identical to the title ID of the save data to be replicated. This allows the write controller 237 to specify the virtual memory card 192 where the save data to be replicated is written in. By allowing the write controller 237 to specify where to store the save data autonomously, the game system 1 that can share the save data easily can be implemented.

If a plurality of virtual memory cards 192 exist for one game title, the write controller 237 determines one of the virtual memory card 192 as a card where the save data is stored. For example, the write controller 237 may determines a virtual memory card 192 having the largest available capacity as the virtual memory card 192 where the save data is stored. If save data having identical name exist in a certain virtual memory card 192, that virtual memory card 192 may be determined so that the save data is overwritten.

Although an explanation is given above in case where one piece of save data is replicated to the mobile game device 100, it is also possible that the write controller 237 can determine where to store a plurality of pieces of save data, respectively. When a user selects a plurality of pieces of save data included in the virtual-memory-card storage 290, the write controller 237 can specify the storage region where respective save data is to be stored based on respective game title IDs and file information of the virtual-memory-card storage 190. Then the write controller 237 can allow the respective save data to be stored into the specified storage regions. In this manner, by allowing the write controller 237 to have a function for determining where to store, it can be determined autonomously where to store a plurality of pieces of save data. This makes it possible to drastically cut down the time required for replication of the save data, compared with the case where a user selects one piece of save data and determines where to store.

It may happen that there exist no virtual memory card 192 that includes the title ID of the save data in the directory structure. In such a case, the write controller 237 can not specify a storage region where the save data is to be stored. Therefore, the write controller 237 makes the storage controller 160 generate a virtual memory card 192 including the title ID in its directory structure in the storage 170. By determining the generated virtual memory card 192 as a region where the save data is to be stored, the write controller 237 can properly store save data selected by a user into the storage 170.

As described above, when the image file of a game program is exported from the game console 200 to the mobile game device 100, a virtual memory card 192 is generated. After the virtual memory card 192 is generated, the write controller 237 may search whether the save data of the game program exists on the virtual memory card 292. If the write controller 237 finds the save data, the write controller 237 replicates the save data on the generated virtual memory card 192. This enables to replicate the image file of a game program and complete the replication of corresponding save data, simultaneously. Thus, a user of the mobile game device 100 can enjoy that game in a short time.

Given above is an explanation based on the exemplary embodiments. These embodiments are intended to be illustrative only and it will be obvious to those skilled in the art that various modifications to constituting elements and processes could be developed and that such modifications are also within the scope of the present invention.

The present invention is applicable to the field of gaming.

What is claimed is:

1. A game system, comprising:
a game console; and
a mobile game device, wherein
the game console and the mobile game device share an image file of a game program, and each includes a respective emulator program for reading and facilitating the execution of the image file of the game program,
at least one of the game console and the mobile game device are of a type not having a memory card interface for an external memory storage medium,
the game program is written in such a way that save data of a game is to be stored in the external memory storage medium,
the image file of the game program includes code that generates a virtual external memory storage medium that appears to the game program as if to be the external memory storage medium, and
the game console and the mobile game device are connected via a wire or wirelessly so as to be able to replicate the save data of the game program from one of the game console and the mobile game device to the other of the game console and the mobile game device.

2. The game system according to claim 1, wherein:
the game console and the mobile game device are connected so as to be able to transmit data with each other via a wire or wirelessly, and the game console is connected to an image-file-providing server retaining an image file via a network, and
the game console acquires an image file from the image-file-providing server, and the mobile game device acquires the image file from the game console so that the image file is shared between the game console and the mobile game device.

3. The game system according to claim 1, wherein one of the game console and the mobile game device retaining save data converts the save data into a format that can be decrypted or executed by the other of the game console and the mobile game device and transmits the converted save data to the other of the game console and the mobile game device, in accordance with a request from the other of the game console and the mobile game device.

4. The game system according to claim 1, wherein one of the game console and the mobile game device provides a function for referring to save data or a folder that stores the save data retained by the other of the game console and the mobile game device, and this reference function allows to refer only to save data of a game program that can be executed by the one of the game console and the mobile game device or to a folder storing the save data.

5. The game system according to claim 1, wherein in case the game console and the mobile game device retain save data of a same game, the older save data is overwritten by the newer save data.

6. The game system according to claim 1, wherein when data such as an image file or like is transmitted from one of the game console and the mobile game device, the one of the game console and the mobile game device identifies the other of the game console and the mobile game device to which the data is to be transmitted and transmits the data after encrypting the data in a manner so that the other of the game console and the mobile game device can decrypt and read the data.

* * * * *